Patented July 14, 1936

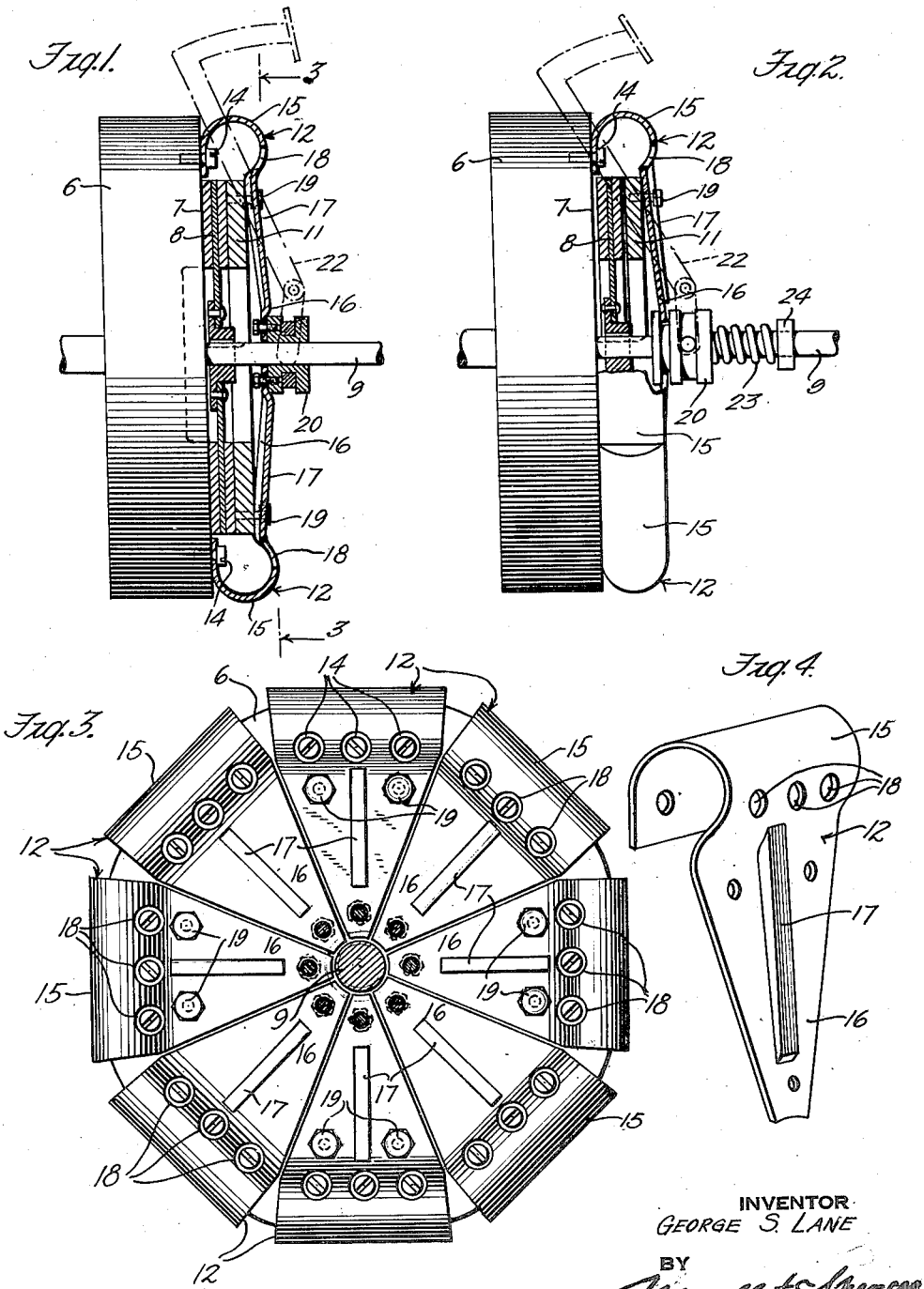

2,047,737

UNITED STATES PATENT OFFICE 2,047,737

CLUTCH MECHANISM

George S. Lane, Ridgewood, N. J., assignor to Raybestos-Manhattan, Inc., Bridgeport, Conn., a corporation of New Jersey Application August 31, 1932, Serial No. 631,203

10 Claims. (Cl. 192—68)

This invention relates to clutch constructions.

The invention is particularly adapted to be embodied in clutch constructions for automobiles. It is to be understood however that the invention is not limited in its application to clutches for automobiles but that it may be embodied in clutches employed in various other machines.

One object of the present invention is to improve and simplify the construction of the clutch-actuating mechanism of clutches.

Another object of the invention is to produce an improved actuating mechanism for clutches which comprises relatively few parts having a compact arrangement, and in which the spring means for moving the clutch members is so formed as to provide a casing enclosing the inner parts of the clutch.

The invention will be clearly understood from the accompanying drawing illustrating the invention in its preferred form and the following detailed description of the constructions therein shown.

In the drawing—

Fig. 1 is a view of a clutch mechanism embodying the invention, partly in side elevation and partly in section taken in a plane containing the axis of the rotary members of the clutch.

Fig. 2 is a view generally similar to Fig. 1 illustrating a modified form of the invention;

Fig. 3 is a sectional view of the clutch taken substantially on the line 3—3 of Fig. 1; and Fig. 4 is a detail perspective view illustrating one of the spring plate members of the clutch.

In the form of the invention shown in the drawing the clutch mechanism comprises a fly wheel 6 constituting the driving element of the clutch. The fly wheel is provided with a friction face 7 arranged to be engaged by a friction face on a friction disk 8 fixed to rotate with the driven shaft 9 but shiftable longitudinally of the shaft, this friction disk constituting the driven element of the clutch. On the outer side of the friction disk is disposed an annular pressure plate 11 constituting an auxiliary driving member of the clutch.

The fly wheel 6 and the pressure plate 11 are arranged to rotate together and the plate is movable axially toward and from the fly wheel. By pressing the plate toward the disk 8, the plate is engaged frictionally with the disk, the disk is pressed into frictional engagement with the face 7 of the fly wheel, and the disk is caused to rotate with the fly wheel and the pressure plate.

The mechanism for supporting the pressure plate 11 and for pressing the plate toward the disk 8 comprises a series of separate spring plates 12. These spring plates are attached at 14 to the adjacent side face of the fly wheel and extend therefrom to the outside of the driven disk 8 and the pressure plate 11. Each of the plates is provided with a spring bow portion 15 located radially outside of the outer peripheries of the disk 8 and the plate 11 so as to clear the same. Each plate is also provided with a portion 16 extending radially inwardly from the bow 15 to a point adjacent the shaft 9 and provided with a longitudinal rib 17 stamped up in the sheet metal of the plate to render the same substantially rigid. The portions 16 of the spring plates are segmental in shape and fit about the shaft substantially in the manner shown in Fig. 3. Thus the spring plates form a housing substantially enclosing the disk 8 and the pressure plate 11. Each of the spring plates is provided with openings 18 through which the screws for securing the plates to the fly wheel and a screw driver for actuating these screws may be inserted.

The spring plates 12 carry the pressure plate 11. To this end each of the spring plates is provided with openings through which are passed bolts 19 for attaching the pressure plate to the spring plates. The engagement of the bolts 19 in these openings supports the pressure plate in centered relation to the driven clutch member. These openings are somewhat larger than the bolts and the bolts engage loosely therein so as to accommodate the movements of the spring plates during the shifting of the same to engage and disengage the clutch.

The inner ends of the portions 16 of the spring plates are attached to a shifting collar 20 which is connected in the usual manner with the clutch shifting mechanism of the usual construction shown in dot-and-dash lines and indicated at 22.

In the construction shown in Fig. 1, the spring bows 15 are so formed as to cause the spring plates normally to exert a pressure in the direction of the fly wheel 6, thereby tending yieldingly to force the pressure plate 11 into firm frictional engagement with the disk 8 and to force the disk 8 against the friction face of the fly wheel 6. Thus the spring plates normally act to hold the clutch engaged. When the clutch releasing mechanism 22 is actuated in the usual manner, the clutch shifting collar 20 is shifted outwardly away from the fly wheel 6 thereby moving the inner ends of the spring plates outwardly against the action of the spring bows 15. This movement of the spring plates carries the pressure plate 11 outwardly to release the clutch.

When the shifting mechanism 22 is released, the spring bows 15 automatically return the inner portions of the spring plates to their normal positions thereby forcing the pressure plate 11 again into frictional contact with the disk 8 and forcing the disk into frictional contact with the fly wheel. The ribs 17 on the spring plates substantially prevent the bending of the portions of the spring plate between the bows and the inner ends of the plate so that the spring action is produced almost entirely by the resilience of the bows.

In the form of the invention illustrated in Fig. 2 the construction is similar to that illustrated in Figs. 1, 3 and 4. In the construction of Fig. 2 however, the bows on the spring plates are so bent that the resilience thereof tends to shift the collar 20 outwardly to cause the disengagement of the clutch. A coiled spring 23 surrounding the shaft 9 is interposed between a collar 24 fixed to the shaft and the shiftable collar 20. The strength of the spring 23 is sufficient to overcome the strength of the spring bows 15 of the spring plates. In the construction shown in this figure, when the clutch shifting mechanism 22 is actuated to disengage the clutch, the collar 20 is moved outwardly against the action of the spring 23, the spring bows 15 assisting in this movement. Upon the release of the clutch shifting mechanism 22, the spring 23 shifts the collar 20 in the reverse direction against the action of the spring bows 15 to engage the clutch. In the construction shown in Fig. 2, the inner ends of the portions 16 of the spring plates, instead of being attached to the shifting collar 20, engage in a groove in said collar.

The clutch is shown in Fig. 1 with the parts in the positions which they assume when the clutch is engaged. In Fig. 2 the parts are shown in the positions which they assume when the clutch is disengaged.

The clutch mechanism above described is comparatively simple in construction, the number of parts being greatly reduced as compared with the ordinary clutch mechanism of this general type. The parts of the clutch are very compactly arranged so that the clutch occupies a relatively small space along the axis of the shaft 9. The clutch is efficient and reliable in operation, and the elimination of the usual coiled springs and the construction and arrangement of the spring plates, renders the clutch less liable to be affected by the high temperatures often produced in the operation of clutch mechanisms of this character.

It is to be understood that the mechanism shown in this application is merely illustrative of the invention and that the invention is not limited thereto but that it may be embodied in many other forms within the scope of the claims.

It is also to be understood that the invention is not limited to the particular construction and arrangement of parts shown and described in the present application.

Having explained the nature and object of the invention and having specifically described a construction embodying the invention in its preferred form, what is claimed is:

1. A clutch mechanism comprising a driving clutch member and a driven clutch member arranged in coaxial relation and relatively movable toward and from each other, a flexible resilient housing member for the clutch attached under tension to one of said clutch members and having a bent formation so as to extend axially away from the latter clutch member about the periphery of the other clutch member and inwardly upon the side thereof remote from the former clutch member and tending to press the driving and driven members together, and means for relieving said tension to disengage the clutch.

2. A clutch mechanism comprising driving and driven clutch members arranged in coaxial relation and relatively movable axially toward and from each other, a flexible resilient housing member attached under tension to one of said clutch members and bent so as to extend therefrom axially of said clutch members and inwardly on the side of the other clutch member remote from the former clutch member and tending to move relatively the driving and driven members axially in one direction, and means for relatively moving said members axially in the opposite direction.

3. A clutch mechanism comprising in combination driving and driven clutch members arranged in coaxial relation and relatively movable axially toward and from each other, a flexible resilient housing member attached under tension to one of said clutch members and bent so as to extend axially about the other clutch member and inwardly upon the side of said other clutch member remote from the former member and tending to move relatively the driving and driven members axially in one direction, and means acting on the inner end of said housing member for moving relatively said clutch members in the opposite direction.

4. A clutch mechanism comprising in combination driving and driven clutch members arranged in coaxial relation and mounted for relative axial movement toward and from each other, a flexible resilient housing member attached under tension to one of said clutch members and extending therefrom axially about the periphery of the other clutch member and inwardly upon the side of the latter member remote from the other clutch member and tending to move relatively the clutch members axially in one direction, a device movable axially of the clutch members for moving the inner end of said housing member in a direction away from the driving and driven clutch members to disengage the clutch, and manually operable means for moving said last member in the latter direction.

5. A clutch mechanism comprising driving and driven clutch members movable relatively in axial directions toward and from each other, a series of spring plates fitting about the axis of the clutch members and extending radially therefrom and each having a bowed outer portion extending about the periphery of one of said members and secured to the other member so as to form, in connection with the latter member, a clutch housing, means carried by said spring plates for yieldingly moving relatively said clutch members in one direction, and means for moving said clutch members relatively in the opposite direction.

6. A clutch mechanism comprising in combination a driving member, a relatively shiftable driven member upon one side of which the driving member is located, a plurality of spring plates secured to the driving member and extending therefrom axially outside the periphery and to the opposite side of the driven member and inwardly on the latter side of said member to points adjacent the axis of the driving and driven members, means carried by the spring plates for engaging frictionally the driven member, and means engaging the inner ends of the spring plates for moving the same to release the driven member.

7. A clutch mechanism comprising in combination a driving member, a relatively shiftable driven member upon one side of which the driving member is located, a plurality of yielding resilient housing plates secured to the driving member and extending therefrom axially outside the periphery and to the opposite side of the driven member to form a housing for the clutch, means actuated by said plates for frictionally engaging the driven member on the latter side thereof, and mechanism for actuating said plates to relieve the pressure of said means on the driven member.

8. A clutch mechanism comprising in combination a driving member, a relatively shiftable driven member upon one side of which the driving member is located, a plurality of yielding resilient housing plates secured to the driving member and extending therefrom axially outside the periphery and to the opposite side of the driven member and inwardly on the latter side of said member toward the axis of the driving and driven members to form a housing for the clutch, means actuated by the resilient plates for engaging frictionally the driven member, and mechanism for moving the inner ends of said plates to relieve the driving engagement between the driving and driven members.

9. A clutch mechanism comprising in combination a driving member, a relatively shiftable driven member upon one side of which the driving member is located, a plurality of spring plates secured to the driving member and extending therefrom outside the driven member to the opposite side thereof, said plates each having a bow portion extending about the periphery of the driven member, means carried by said plates for frictionally engaging the driven member on the latter side thereof, and mechanism for moving said last means to relieve the driving engagement between the driving and driven members.

10. A clutch mechanism comprising in combination a driving member, a driven member shiftable axially with relation to the driving member, a series of bow springs secured to the driving member and surrounding the driven member, means attached to said bow springs and actuated by the same for actuating the driven member, and means for releasing said driven member from driving engagement with the driving member.

GEORGE S. LANE.